Dec. 30, 1947.     F. W. SCHMITZ     2,433,486
DEW POINT INSTRUMENT
Filed Sept. 11, 1945
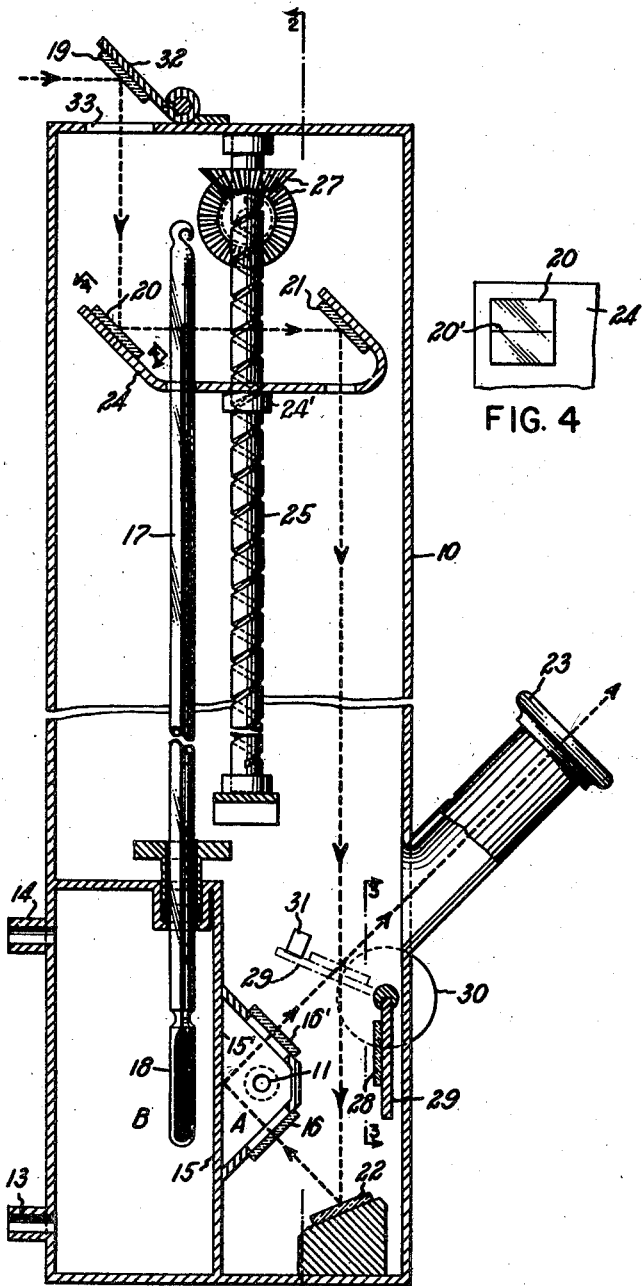
FIG. 1
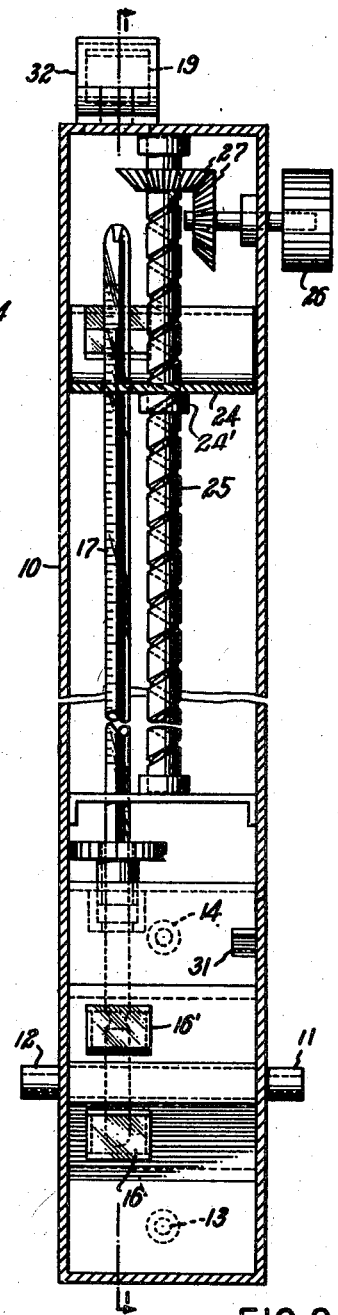
FIG. 2
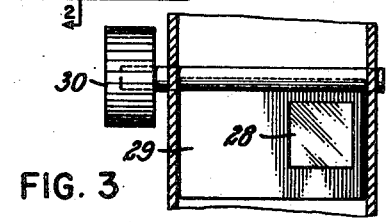
FIG. 3
FIG. 4
INVENTOR
Frederick W. Schmitz
BY Pierce + Schaffler
ATTORNEYS

UNITED STATES PATENT OFFICE 2,433,486

DEW POINT INSTRUMENT

Frederick W. Schmitz, Irvington, N. J., assignor to Research Corporation, New York, N. Y., a corporation of New York Application September 11, 1945, Serial No. 615,555

2 Claims. (Cl. 73—17)

This invention relates to an instrument for determining the moisture content of gases by measuring the dew point thereof.

The dew point of a gas is the temperature at which it begins to deposit liquid particles of a vapor component of the gas and is a measure of the percentage composition of the vapor component in the gas. The dew point is independent of the particular gas and depends solely on the vapor component and its percentage composition in the gas. It is particularly useful as a measure of the water vapor content of a gas such as air or heating gas.

An object of the invention is the provision of apparatus for the rapid and accurate determination of the temperature at which condensible vapors in a gas reach saturation and commence to condense.

A further object of the invention is the provision of apparatus including means for bringing a coolant medium into heat exchange relation with a gas sample through a wall member having a light reflecting surface in contact with the gas, and means for observing upon the light reflecting surface the temperature indication of a temperature measuring instrument having its temperature sensitive element in the coolant medium adjacent the wall member whereby the temperature at which clouding of the wall member by condensation of a vapor component of the gas occurs may be accurately determined.

Other objects and advantages of the invention will be apparent from the following description.

Briefly stated, the apparatus of the invention comprises means defining a chamber for containing a gas sample including a heat conductive wall portion having a light-reflective surface interiorly of the chamber, means for contacting a coolant medium with the exterior surface of the heat conductive wall portion, a temperature responsive instrument positioned with the temperature sensitive element thereof in the coolant medium adjacent the heat conductive wall portion, and optical elements positioned to reflect the temperature indicating portion of the instrument upon the light reflecting surface of the heat conductive wall portion of the gas chamber.

In order to illustrate the principles of the invention an advantageous form of the invention will be more particularly described with reference to the accompanying drawing, in which Fig. 1 is a vertical sectional elevation of an apparatus embodying the principles of the invention;

Fig. 2 is a vertical sectional elevation on line 2—2 of Fig. 1; and

Figs. 3 and 4 are fragmentary details on lines 3—3 and 4—4, respectively, of Fig. 1.

The apparatus shown in the drawing comprises a housing 10, including a gas sample chamber A having inlet 11 and outlet 12, and a coolant chamber B having an inlet 13 and outlet 14. The heat conductive wall portion 15 between chambers A and B has a light reflective, preferably specular, surface 15' interiorly of the gas chamber A. The gas chamber A is provided with windows 16, 16'.

A thermometer 17 is positioned in the coolant chamber with its temperature sensitive bulb adjacent the wall portion 15. A mirror system comprising successively mirrors 19, 20, 21, 22, and wall surface 15' reflects light through the stem of thermometer 17 into eyepiece 23. Mirrors 20 and 21 are carried on a member 24 having a boss 24' in threaded engagement with screw 25. Rotation of screw 25 by means of knob 26 and gears 27 moves the member 24 up and down along the screws 25, whereby the position of the mirrors 20, 21 may be maintained at the level of the mercury column in the thermometer.

It will be seen that by observing the image of the mercury meniscus on surface 15' through eyepiece 23, the operator can readily note the exact temperature at which the position of the meniscus can no longer be seen due to clouding of surface 15' by vapor condensation. This is an accurate and closely reproducible indication of the dew point of the gas in chamber A. By keeping reference mark 20' on mirror 20 continually at the level of the mercury meniscus by manipulation of knob 26, the position of the final reading is fixed and may be checked without removing the eye from eyepiece 23 by rotating mirror 28 on pivoted support 29 by means of knob 30 into engagement with stop 31, as shown in dotted lines in Fig. 1. This also provides an erect image of the thermometer reading which is inverted when mirror 28 is not in the optical path.

Mirror 19 is preferably mounted on a pivoted support 32, so that it may be rotated downward into opening 33 in the cover of case 10 for transportation of the apparatus.

It will be clear that many modifications can be made in the form and arrangement of the apparatus without departing from the principles of the invention as defined in the claims hereof.

For example, the mercury thermometer may be replaced by other temperature measuring devices such as bimetallic thermometers or resistance thermometers, and the temperature indicating face of such a device may be reflected upon the surface 15' by means of mirrors or prisms.

I claim:

1. Apparatus for determining the dew point of a gas comprising means defining a chamber for containing a gas sample including a heat conductive wall portion having a specular surface interiorly of the chamber, means for contacting a coolant medium with the exterior surface of said heat conductive wall portion, a temperature responsive instrument positioned with the temperature sensitive element thereof in the coolant medium adjacent said heat conductive wall portion, and optical elements positioned to reflect the temperature indicating portion of said instrument upon said specular surface.

2. Apparatus for determining the dew point of a gas comprising means defining a chamber for containing a gas sample including a heat conductive wall portion having a specular surface interiorly of the chamber, means for contacting a coolant medium with the exterior surface of said head conductive wall portion, a temperature responsive instrument positioned with the temperature sensitive element thereof in the coolant medium adjacent said heat conductive wall portion, optical elements positioned to cause an image of the temperature indicating portion of said instrument to be reflected from said specular surface to an observation point, and means interposable in said optical elements for reflecting said image directly to said observation point.

FREDERICK W. SCHMITZ.

REFERENCES CITED

The following references are of record in the file of this patent:

UNITED STATES PATENTS

| Number | Name | Date |
| --- | --- | --- |
| 2,108,173 | Martin et al. | Feb. 15, 1938 |
| 2,268,785 | Thornthwaite | Jan. 6, 1942 |
| 2,281,418 | Deaton et al. | Apr. 28, 1942 |